(12) United States Patent
Puetz et al.

(10) Patent No.: US 7,893,116 B2
(45) Date of Patent: Feb. 22, 2011

(54) DEFOAMING COMPOSITIONS FOR WATER-DILUTABLE PAINT SYSTEMS

(75) Inventors: Hermann-Josef Puetz, Leverkusen (DE); Markus Dierker, Duesseldorf (DE); Heinz-Guenther Schulte, Kaarst (DE)

(73) Assignee: Cognis IP Management GmbH, Duesseldorf (DE)

( * ) Notice: Subject to any disclaimer, the term of this patent is extended or adjusted under 35 U.S.C. 154(b) by 391 days.

(21) Appl. No.: 11/569,438

(22) PCT Filed: Apr. 12, 2005

(86) PCT No.: PCT/EP2005/005159

§ 371 (c)(1),
(2), (4) Date: Nov. 21, 2006

(87) PCT Pub. No.: WO2005/113691

PCT Pub. Date: Dec. 1, 2005

(65) Prior Publication Data

US 2008/0021117 A1   Jan. 24, 2008

(30) Foreign Application Priority Data

May 21, 2004   (DE) ................. 10 2004 024 947

(51) Int. Cl.
*B01D 19/04*   (2006.01)
(52) U.S. Cl. .................... 516/133; 516/125
(58) Field of Classification Search ............ 516/133
See application file for complete search history.

(56) References Cited

U.S. PATENT DOCUMENTS 2,762,780 A * 9/1956 Kulakow ............... 516/133
4,880,564 A * 11/1989 Abel et al. ............. 516/125

FOREIGN PATENT DOCUMENTS

DE   197 51 288   5/1999

* cited by examiner

*Primary Examiner*—Ling-Siu Choi
*Assistant Examiner*—Chun-Cheng Wang

(57) ABSTRACT

A defoamer composition for water-dilutable paint systems includes one or more glycerides; one or more aliphatic hydrocarbons; and one or more addition products of ethylene oxide (EO) and/or propylene oxide (PO) onto $C_{8-24}$ fatty alcohols.

13 Claims, No Drawings

DEFOAMING COMPOSITIONS FOR WATER-DILUTABLE PAINT SYSTEMS

RELATED APPLICATIONS

This application is a national phase filing under 35 U.S.C. §371 of International Application No. PCT/EP2005/005159, filed on May 12, 2005, which designated the United States of America and which hereby claims priority from German Application DE 10 2004024947.4, filed on May 21, 2004, the entire disclosures of which are hereby incorporated herein by reference.

FILED OF THE INVENTION

This invention relates generally to defoamer compositions, and more particularly, to defoamer compositions for water-dilutable paint systems.

BACKGROUND INFORMATION

Associated with water-dilutable paints is a "popping" limit. To understand what is meant by the expression "popping limit", the connections familiar to the expert with the phenomenon of popping will first be explained. Small round depressions in paint films are known among experts as craters. A special form of craters are the so-called pops which, in the case of stoving paints for example, are formed in the presence of readily volatile solvents. The solvents evaporate relatively quickly from the upper layers of the paint film on drying, so that the viscosity at the surface increases and rapidly closes them. The solvents evaporating from the lower paint layers then form bubbles which burst and cannot be closed by the paint already highly viscous at the surface. Pinholes or craters then appear in the dry film. The phenomenon of popping also occurs in water-containing paint systems. In this case, water evaporates from the surface of the paint layer accompanied by the increase in viscosity just mentioned. When the water present in lower paint layers subsequently evaporates, small bubbles are formed which, on bursting, lead to the described cratering effect (also known as popping or pinholing). In addition, small bubbles in areas near the surface can be visually unattractive even before they burst because they spoil the uniform appearance of the surface (blisters).

SUMMARY OF THE INVENTION

Briefly described, according to an aspect of the invention, a defoamer composition for water-dilutable paint systems includes one or more glycerides; one or more aliphatic hydrocarbons; and c) one or more addition products of ethylene oxide (EO) and/or propylene oxide (PO) onto $C_{8-24}$ fatty alcohols.

According to another aspect of the invention, a defoamer composition for water-dilutable paint systems includes from about 5% to about 80% by weight of one or more glycerides; b) from about 5% to about 90% by weight of one or more aliphatic hydrocarbons; and c) from about 5% to about 60% by weight of one or more addition products of ethylene oxide (EO) and/or propylene oxide (PO) onto $C_{8-24}$ fatty alcohols.

In yet another aspect of the invention, a defoamer composition for water-dilutable paint systems includes from about 20% to about 60% by weight of one or more glycerides; from about 30% to about 60% by weight of one or more aliphatic hydrocarbons; and from about 10% to about 40% by weight of one or more addition products of ethylene oxide (EO) and/or propylene oxide (PO) onto $C_{8-24}$ fatty alcohols.

DETAILED DESCRIPTION OF THE INVENTION

The problem addressed by the present invention was to provide defoamer compositions for water-dilutable paint systems. More particularly, these defoamers would have the following properties. They would have good defoaming properties during production of the paint systems and during spray application (for example pneumatic compressed air spraying with 4-5 bar atomizer air, airless spraying, electrostatic high-speed atomizer)

In addition, the defoamers would solve the problem of increasing the "popping" limit of water-dilutable stoving paints.

Now, the more effective a paint system is in regard to the unwanted phenomenon of popping, the greater the thickness of the paint layer which is free from pops or pinholes. In this sense, the "popping limit" in the context of the present invention is understood to be the determined dry layer thickness of the hardened paint up to which no popping or pinholing can be detected. Only when the critical layer thickness of the hardened paint is exceeded, as determined by the popping limit, does the unwanted phenomenon of popping occur. The popping limit is determined by painting a visible wedge, i.e., a continuous increase in the layer thickness on a test plate. Increasing the popping limit, i.e. the critical dry layer thickness of the paint, enables the paint to be applied in a reasonable layer thickness without film defects occurring on stoving through the sudden evaporation of water or solvent. On the one hand this is economically desirable, on the other hand it promotes safe use because manually applied paint is consistently sprayed on too thickly. Relatively thick layers can also be formed during automatic spraying by robots through air eddies, running down vertical surfaces, variations in temperature and viscosity and in overlap regions. This is reflected in popping or pinholing in the final paint film.

Another problem addressed by the present invention was to ensure that the defoamers according to the invention would not have any adverse effects on the paint film (high compatibilities), would not cause any craters or loss of gloss, would not reduce adhesion to the substrate, would not impair adhesion to the following layer of paint and would not adversely affect the appearance of the paint film.

Another problem addressed by the invention was to ensure that the defoamers according to the invention would guarantee good flow properties and good substrate wetting of the paint containing them.

It has now surprisingly been found that ternary compositions containing glycerides, aliphatic hydrocarbons and addition products of ethylene oxide (EO) and/or propylene oxide (PO) onto fatty alcohols excellently solve the problems stated above in every respect.

Accordingly, the present invention relates to defoamer compositions for water-dilutable paint systems containing a) one or more glycerides, b) one or more aliphatic hydrocarbons and c) one or more optionally end-capped addition products of ethylene oxide (EO) and/or propylene oxide (PO) onto $C_{8-24}$ fatty alcohols.

Components a), b) and c)

a) Glycerides

Glycerides in the context of the present invention are understood to be mono-, di- and triesters of glycerol with $C_{8-24}$ fatty acids. In the context of the present invention and in line with standard chemical terminology, monoesters of glycerol with fatty acids are known as monoglycerides, diesters of glycerol with fatty acids as diglycerides and triesters of glycerol with fatty acids as triglycerides. In the case of the monoesters, it is immaterial whether the glycerol on which the glycerides are based is esterified in the 1- or the 2-position. In the case of the diesters, it is immaterial whether the glycerol on which the glycerides are based is esterified in the 1- and 2-position or in the 1- and 3-position.

Mixtures of various mono-, di- and triesters of glycerol with the fatty acids mentioned may also be used.

The glycerides may be present in the compositions according to the invention as such or in the form of technical mixtures. A characteristic of technical mixtures—particularly when they are derived from naturally renewable raw materials—is that they contain fatty acid components with different C chain lengths.

According to the invention, diglycerides are particularly preferred. Diglycerides of technical quality may also contain mono- and/or triglycerides. In a preferred embodiment, the percentage content of diglycerides is from 20 to 80% by weight, based on the total quantity of mono-/diglycerides, mono-/triglycerides or mono-/di-/triglycerides. A percentage diglyceride content of 35 to 70% by weight and more particularly 45 to 60% by weight is preferred.

In diglycerides of technical quality, the percentage content of free glycerol is preferably below 5% by weight, more preferably below 3% by weight and most preferably below 1.5% by weight.

As already mentioned, the chain lengths of the fatty acid components in the glycerides is in the range from 8 to 24 carbon atoms. A range from 12 to 18 carbon atoms is preferred.

The fatty acid components are preferably of natural origin and may be saturated or unsaturated. One embodiment is characterized by the use of glycerides of which the fatty acid components are highly unsaturated. Examples of suitable fatty acid components are fatty acids from sunflower oil, rapeseed oil, soybean oil, coconut oil or tall oil. Examples of particularly suitable fatty acid components of the diglycerides are oleic acid, linoleic acid, linolenic acid, conjugated linoleic acids.

b) Aliphatic Hydrocarbons

The aliphatic hydrocarbons (b) may be linear, branched or cyclic. In addition, they may be saturated or mono- or polyolefinically unsaturated. They may contain at most 18% by weight (based on all hydrocarbons) of aromatic hydrocarbons. The compounds (b) are preferably low in aromatic hydrocarbons and contain less than 1% by weight and more particularly less than 0.1% by weight (based on all hydrocarbons) of aromatic hydrocarbons.

The compounds (b) have boiling ranges of, in particular, 140 to 280° C. A range of 170 to 260° C. and more particularly 180 to 240° C. is preferred.

c) Addition Products of (EO) and/or (PO) onto Fatty Alcohols

Optionally end-capped addition products of ethylene oxide (EO) and/or propylene oxide (PO) onto $C_{8-24}$ fatty alcohols are used as another component of the compositions according to the invention. "End-capped" means that the free OH group of the addition products of ethylene oxide (EO) and/or propylene oxide (PO) onto $C_{8-24}$ fatty alcohols is present in etherified form as a group OR where R is a $C_{1-4}$ alkyl group or may even be a benzyl group. Accordingly, R may represent methyl, ethyl, n-propyl, i-propyl, n-butyl, i-butyl, sec. butyl or benzyl, methyl and the butyl groups mentioned being preferred.

Examples of suitable substances of type c) are Dehypon LS 24, Dehypon LS 36, Dehypon LS 45, Dehypon LS 54, Dehypon LT 054, Dehypon LS 104 (all products of Cognis Deutschland GmbH & Co. KG).

Addition products of ethylene oxide (EO) and/or propylene oxide (PO) onto $C_{8-24}$ fatty alcohols which contain a free OH group, i.e. are not end-capped, are preferably used.

The chain length of the fatty alcohols in the addition products mentioned is preferably from 10 to 16 and more particularly from 12 to 14 carbon atoms.

The adducts contain in all at least 2 mol EO and/or PO per mol fatty alcohol. The quantity of EO is preferably from 0 to 10 and more particularly from 2 to 5 mol per mol fatty alcohol. The quantity of PO is preferably from 0 to 10 and more particularly from 2 to 4 mol per mol fatty alcohol. The adducts preferably contain in all from 2 to 15 and more particularly from 4 to 9 mol EO and/or PO per mol fatty alcohol.

Defoamer Compositions

The defoamer compositions for water-dilutable paint systems contain components a), b) and c) described in detail in the foregoing. Based on the sum total of components a), b) and c) in the defoamer compositions, the percentage content of component a) is preferably from 5 to 80% by weight and more particularly from 20 to 60% by weight the percentage content of component b) is preferably from 5 to 90% by weight and more particularly from 30 to 60% by weight and the percentage content of component c) is preferably from 5 to 60% by weight and more particularly from 10 to 40% by weight.

If desired, the defoamer compositions may contain additional components, for example oxo oils, fatty acid esters, silica, waxes, pure and modified silicone oils.

The defoamer compositions according to the invention are used in water-dilutable paint systems. Studies by applicants have surprisingly shown that, in water-dilutable stoving fillers, the popping limit is clearly increased, i.e. by more than 20% compared to the corresponding water-dilutable stoving fillers without the defoamers according to the invention. The surface of the paint film has no negative properties (no craters or pinholes, no reduction in gloss). It is distinguished by a good appearance. The flow of the paint is positively improved, as visible to the eye.

EXAMPLES

Substances Used

Fatty alcohol EO/PO: addition product of 5 mol ethylene oxide and 4 mol propylene oxide onto 1 mol $C_{12-14}$ fatty alcohol ("Dehypon LS 54", Cognis)

Aliphatic hydrocarbon: aliphatic hydrocarbon ("Isopar L", Exxon Chemical)

Hyflo: flux-calcined kieselgur ("Hyflo Super Cel", Celite Corporation)

Fascat: tin oxalate ("Fascat 2001", Atofina)

Bayhydrol D 270: water dilutable oil-free saturated polyester (Bayer)

Bayhydrol FT 145: water dilutable fatty-acid-modified polyurethane resin (Bayer)

Tall oil fatty acid: tall oil fatty acid, acid value 199, iodine value 155 ("Sylfat 2 LT", Arizona Chemical)

Maprenal MF 904: hexamethoxymethyl melamine (HMMM) resin (UCB)

DMEA Lff: amine (BASF AG)

Hydropalat 7003: complex phosphoric acid ester (Cognis)

Spezialschwarz 4: carbon black (Degussa)

Tronox R-FD-I: titanium dioxide rutile (Kerr McGee)

Blanc fixe micro: precipitated barium sulfate (Sachtleben)

Talkum IT extra: talcum (Mondo Minerals)

Production Processes for Diglycerides

Example 1

Materials 70 mol=20.90 kg tall oil fatty acid
35 mol=3.22 kg glycerol
6.9 g Fascat Apparatus Laboratory reactor, $N_2$ inlet, water separator Method All components were first heated together for 5.5 hours to 200® C. on the water separator. During the reaction, the temperature was increased to 240° C. as the elimination of water abated. The reaction mixture was then cooled to 210° C. and a vacuum (ca. 60-70 mbar) was applied for 1.5 hours. 100 g Hyflo were then added and the mixture was stirred in vacuo (ca. 60-70 mbar) for 1 hour at 80° C. Finally, the product was filtered under suction, the Hyflow remaining behind on the filter. Through the use of Hyflow besides filtration, the catalyst was removed from the product. 21.2 kg of a yellow, clear product were obtained. The product had the following values: acid value (AV) 1.2, hydroxyl value (OHV) 86.

Example 2

The procedure was as in Example 1 except that the quantities shown under "materials" were altered as follows:

3.8 mol (1.071 kg) tall oil fatty acid
2 mol (0.184 kg) glycerol
0.4 g Fascat 2001

The product had the following values: AV 1.5, OHV 103.

Example 3

The procedure was as in Example 2 except that the quantities shown under "materials" were altered as follows:

12.2 mol (3.50 kg) tall oil fatty acid
6.1 mol (0.561 kg) glycerol
1.2 g Fascat 2001

The product had the following values: AV 5.8, OHV 80.

Example 4

The procedure was as in Example 1 except that the reaction time in the step described under "method" was only 3 hours instead of 5.5 hours.

The product had the following values: AV 1.7, OHV 86.

Performance Tests

Series I cf. Table 1

Various mixtures of fatty acid diglycerides, aliphatic hydrocarbon and fatty alcohol EO/PO adducts were tested in a light-gray-pigmented water-dilutable stoving paint system (binder base: mixture of saturated polyester, PES/PUR dispersion and melamine resin). Particulars of the production and composition of the formulations and the performance results obtained can be found in Table 1. Tests V6 to V8 correspond to the invention, tests V1 to V5 are intended for comparison. As can also be seen from Table 1, the formulations were produced by initially introducing a basic paint formulation and then incorporating the components fatty acid diglyceride, aliphatic hydrocarbon and fatty alcohol EO/PO adduct in the quantities indicated by stirring for 15 minutes at 5,000 r.p.m. in a grinding pot with dissolver disk (manufacturer: VMA Getzmann), followed by 20 minutes' treatment at 4,000 r.p.m. in a bead mill with a Teflon grinding disk and glass beads. The components Bayhydrol D 270, distilled water, Maprenal MF 904 and Hydropalat 140 were then added in the quantities shown and the whole was stirred for 10 minutes at 1,500 r.p.m. Finally, after standing for 1 hour, a pH of 8.4 to 8.6 was adjusted with DMEA. The viscosity was adjusted to a flow time of 30 to 32 secs. using a DIN 4 flow cup. Using a cup fed spray gun (1.2 mm nozzle, 4 bar atomizer pressure), the various paint formulations were applied in a wedge to a steel plate (dry layer thickness ca. 20 µm to 50 µm). The paints were then dried under the following drying conditions: 10 minutes airing at 20° C., 10 minutes recirculating air oven at 80° C., 20 minutes recirculating air oven at 160° C. After cooling, the surface was evaluated on the basis of the following criteria:

gloss: measured at angles of 20° and 60° for a dry layer thickness of 40 µm (gloss determination to DIN EN ISO 2813)

popping limit: the boundary of the popping-free layer was evaluated (i.e. maximum dry layer thickness free from craters and pinholes) and the dry layer thickness (in micrometers) was subsequently determined to DIN EN ISO 2808 using a thickness gauge viscosity: determination of flow time using flow cups to DIN EN ISO 2431 appearance: appearance was evaluated as the surface quality (flow/overall visual impression/surface uniformity/surface defects such as depressions, craters, pinholes). Evaluation was visual and quantified by a "school marking system" (1=very good, 5=very poor). The dried painted surfaces of the test plates were evaluated by comparison with one another.

Series II cf. Table 2

The following tests were carried out with compositions similar to those described in Series I. However, the series II compositions are binder mixtures (i.e. no pigments, fillers, dispersion additives or wetting agents present). The test results of series II show in particular the defoaming effect during the production process.

Particulars of the production of the formulation can be found in Table 2: Bayhydrol D 270 was initially introduced and distilled water was added with slow stirring. Maprenal MF 904 and Bayhydrol FT 145 were then added and the solution was adjusted to pH 8.5 with DMEA. The solution was then made up to 100 parts with water and stirred for another 10 mins. at 2,000 r.p.m. After the binder solution had been stirred for 24 hours, quantities of 150 g were weighed off for each test (V1b to V8b), 1.4% of the defoamer mixtures were added and the whole was foamed for 3 minutes at 5,000 r.p.m. using a laboratory dissolver. Density was determined with a pyknometer after 1 minute, 1 hour, 6 hours, 1 day and 7 days. The defoaming effect can be evaluated from the figures obtained. The tests according to the invention (V6b to V8b) all reached their end result (=no more air trapped in the binder solution) after only 6 hours. Density determination was carried out to density determination: pyknometer method to DIN 53217-2

Results

The tests of series I show in particular the performance-related effects in regard to increasing the popping limit appearance gloss The tests of series IT show the performance-related effects in regard to defoaming effect In the overall property profile, only the compositions according to the invention (see tests V6a to V8a and V6b to V8b) show a distinct increase in the popping limit, a positive effect on appearance for only very slightly reduced gloss and a very good defoaming effect in relation to the comparison tests (see tests V1a to V5a and V1b to V5b).

TABLE 1

|  | Test | | | | | | | |
| --- | --- | --- | --- | --- | --- | --- | --- | --- |
|  | V1a | V2a | V3a | V4a | V5a | V6a | V7a | V8a |
| Bayhydrol D 270, 70% | 6.00 | 6.00 | 6.00 | 6.00 | 6.00 | 6.00 | 6.00 | 6.00 |
| Dist. water | 12.00 | 12.00 | 12.00 | 12.00 | 12.00 | 12.00 | 12.00 | 12.00 |
| Bayhydrol FT 145, 45% | 15.00 | 15.00 | 15.00 | 15.00 | 15.00 | 15.00 | 15.00 | 15.00 |
| DMEA, l.ff. | 0.35 | 0.35 | 0.35 | 0.35 | 0.35 | 0.35 | 0.35 | 0.35 |
| Hydropalat 7003 | 0.60 | 0.60 | 0.60 | 0.60 | 0.60 | 0.60 | 0.60 | 0.60 |
| Spezialschwarz 4 | 0.03 | 0.03 | 0.03 | 0.03 | 0.03 | 0.03 | 0.03 | 0.03 |
| Tronox R-FD-I | 10.00 | 10.00 | 10.00 | 10.00 | 10.00 | 10.00 | 10.00 | 10.00 |
| Blanc fixe micro | 14.00 | 14.00 | 14.00 | 14.00 | 14.00 | 14.00 | 14.00 | 14.00 |
| Talkum IT extra | 4.00 | 4.00 | 4.00 | 4.00 | 4.00 | 4.00 | 4.00 | 4.00 |
| Fatty alcohol EO/PO (*) |  |  | 1.00 |  |  | 0.2 | 0.2 | 0.2 |
| Aliphatic HC (*) |  |  |  | 1.00 | 0.5 | 0.4 | 0.4 | 0.4 |
| Diglyceride of Example 1 |  | 1.00 |  |  | 0.5 | 0.4 |  |  |
| Diglyceride of Example 2 |  |  |  |  |  |  | 0.4 |  |
| Diglyceride if Example 3 |  |  |  |  |  |  |  | 0.4 |
| 15 Mins. stirring at 5000 r.p.m. |  |  |  |  |  |  |  |  |
| 20 Mins. bead mill with glass beads, 4000 r.p.m. |  |  |  |  |  |  |  |  |
| Bayhydrol D 270, 70% | 12.50 | 12.50 | 12.50 | 12.50 | 12.50 | 12.50 | 12.50 | 12.50 |
| Dist. water | 20.00 | 20.00 | 20.00 | 20.00 | 20.00 | 20.00 | 20.00 | 20.00 |
| Maprenal MF 904, 95% | 3.30 | 3.30 | 3.30 | 3.30 | 3.30 | 3.30 | 3.30 | 3.30 |
| Hydropalat 140 | 0.30 | 0.30 | 0.30 | 0.30 | 0.30 | 0.30 | 0.30 | 0.30 |
| 10 Mins. 1500 r.p.m. (+1 standing for 1 day) |  |  |  |  |  |  |  |  |
| Adjust pH to 8.4-8.6 with DMEA |  |  |  |  |  |  |  |  |
| Dist. water | 1.92 | 0.92 | 0.92 | 0.92 | 0.92 | 0.92 | 0.92 | 0.92 |
| Sum total of components | 100.00 | 100.00 | 100.00 | 100.00 | 100.00 | 100.00 | 100.00 | 100.00 |
| Initial viscosity DIN4 | 60 | 76 | 110 | 56 | 77 | 87 | 85 | 84 |
| Adjust visc. to 30-32 s DIN4 |  |  |  |  |  |  |  |  |
| Apply paint with compressed air spray gun, 4 bar atomizer pressure |  |  |  |  |  |  |  |  |
| Stoving conditions: 10 mins. airing, 10 mins. 80° C., 20 mins. 160° C. |  |  |  |  |  |  |  |  |
| Gloss 20° angle - 40 μm | 51 | 40 | 48 | 51 | 44 | 49 | 47 | 52 |
| Gloss 60° angle - 40 μm | 89 | 83 | 87 | 89 | 85 | 88 | 87 | 88 |
| Popping-free in μm to: | 38 | 47 | 41 | 45 | 46 | 48 | 48 | 47 |

Tests V1a-V5a = for comparison

Tests V6a = V8a = invention

Quantities of formulation ingredients = parts by weight (*) The components fatty alcohol EO/PO and aliphat. hydrocarbon were mixed before addition to the formulation

TABLE 2

|  | V1b | V2b | V3b | V4b | V5b | V6b | V7b | V8b |
|---|---|---|---|---|---|---|---|---|
| Bayhydrol D 270 | 25.90 | 25.90 | 25.90 | 25.90 | 25.90 | 25.90 | 25.90 | 25.90 |
| Dist. water | 35.00 | 35.00 | 35.00 | 35.00 | 35.00 | 35.00 | 35.00 | 35.00 |
| Maprenal MF 904, 95% | 4.60 | 4.60 | 4.60 | 4.60 | 4.60 | 4.60 | 4.60 | 4.60 |
| Bayhadrol FT 145 | 21.00 | 21.00 | 21.00 | 21.00 | 21.00 | 21.00 | 21.00 | 21.00 |
| DMEA | 0.50 | 0.50 | 0.50 | 0.50 | 0.50 | 0.50 | 0.50 | 0.50 |
| Dist. water | 13.00 | 13.00 | 13.00 | 13.00 | 13.00 | 13.00 | 13.00 | 13.00 |
| Sum total of components | 100.00 | 100.00 | 100.00 | 100.00 | 100.00 | 100.00 | 100.00 | 100.00 |
| pH adjusted to: | 8.50 | | | | | | | |
| Viscosity DIN 4 | 40 s | | | | | | | |
| Diglyceride of Example 1 | | 1.40 | | | | | | |
| Dehypon LS 54 | | | 1.40 | | | 0.28 | 0.28 | 0.28 |
| Isopar L (aliph. HC) | | | | 1.40 | 0.70 | 0.56 | 0.56 | 0.56 |
| Diglyceride of Example 1 | | | | | 0.70 | 0.56 | | |
| Diglyceride of Example 2 | | | | | | | 0.56 | |
| Diglyceride of Example 3 | | | | | | | | 0.56 |
| 3 Min. diss. 5000 r.p.m. | | | | | | | | |
| Density measurements: | | | | | | | | |
| Density measured after 1 min. | 0.714 | 1.012 | 0.792 | 0.968 | 1.002 | 0.995 | 0.992 | 0.982 |
| Density measured after 1 hour | 0.824 | 1.045 | 0.832 | 1.025 | 1.047 | 1.048 | 1.045 | 1.044 |
| Density measured after 6 hour | 0.991 | 1.054 | 1.053 | 1.052 | 1.055 | 1.055 | 1.054 | 1.055 |
| Density measured after 1 day | 1.056 | 1.056 | 1.055 | 1.053 | 1.056 | 1.055 | 1.055 | 1.055 |
| Density measured after 7 days | 1.057 | 1.056 | 1.056 | 1.054 | 1.056 | 1.055 | 1.055 | 1.055 |

Tests V1b-V5b = for comparison
Tests V6b-V8b = invention
Quantities of formulation ingredients = parts by weight

What is claimed is:

1. A defoamer composition for water-dilutable paint systems, consisting of:
   a) one or more glycerides;
   b) one or more aliphatic hydrocarbons; and
   c) one or more addition products of ethylene oxide (EO) and/or propylene oxide (PO) onto $C_{8-24}$ fatty alcohols,
wherein said defoamer composition is incorporated into a water-dilutable paint system.

2. The defoamer composition according to claim 1, wherein said one or more glycerides comprise diglycerides.

3. The defoamer composition according to claim 2, wherein said diglycerides comprise diesters of glycerol with $C_{8-24}$ fatty acids.

4. The defoamer composition according to claim 2, wherein said diglycerides are in the form of technical mixtures.

5. The defoamer composition according to claim 1, wherein said one or more glycerides are derived from $C_{8-24}$ fatty acids.

6. The defoamer composition according to claim 1, wherein said one or more glycerides are derived from $C_{12-18}$ fatty acids.

7. The defoamer composition according to claim 1, wherein said one or more addition products are end-capped.

8. A water-dilutable paint system comprising the defoamer composition of claim 1.

9. The defoamer composition for water-dilutable paint systems of claim 1, consisting of:
   a) from about 5% to about 80% by weight of one or more glycerides;
   b) from about 5% to about 90% by weight of one or more aliphatic hydrocarbons; and
   c) from about 5% to about 60% by weight of one or more addition products of ethylene oxide (EO) and/or propylene oxide (PO) onto $C_{8-24}$ fatty alcohols,
wherein said defoamer composition is incorporated into a water-dilutable paint system.

10. The defoamer composition for water-dilutable paint systems of claim 9, consisting of:
   a) from about 20% to about 60% by weight of one or more glycerides;
   b) from about 30% to about 60% by weight of one or more aliphatic hydrocarbons; and
   c) from about 10% to about 40% by weight of one or more addition products of ethylene oxide (EO) and/or propylene oxide (PO) onto $C_{8-24}$ fatty alcohols,
wherein said defoamer composition is incorporated into a water-dilutable paint system.

11. The water-dilutable paint system of claim 8, wherein said defoamer composition comprises about 1.0% to about 1.4% by weight, based on the total weight of the water-dilutable paint system.

12. The defoamer composition of claim 9, wherein said composition is incorporated into a water-dilutable paint system at a concentration of about 1.0% to about 1.4% by weight, based on the total weight of the water-dilutable paint system.

13. The defoamer composition of claim 10, wherein said composition is incorporated into a water-dilutable paint system at a concentration of about 1.0% to about 1.4% by weight, based on the total weight of the water-dilutable paint system.

* * * * *